Aug. 28, 1934.  E. J. ROBERTSON  1,971,991
FUNERAL COACH
Filed Aug. 21, 1933   4 Sheets-Sheet 1

Edwin J. Robertson INVENTOR
BY Victor J. Evans & Co.
ATTORNEY

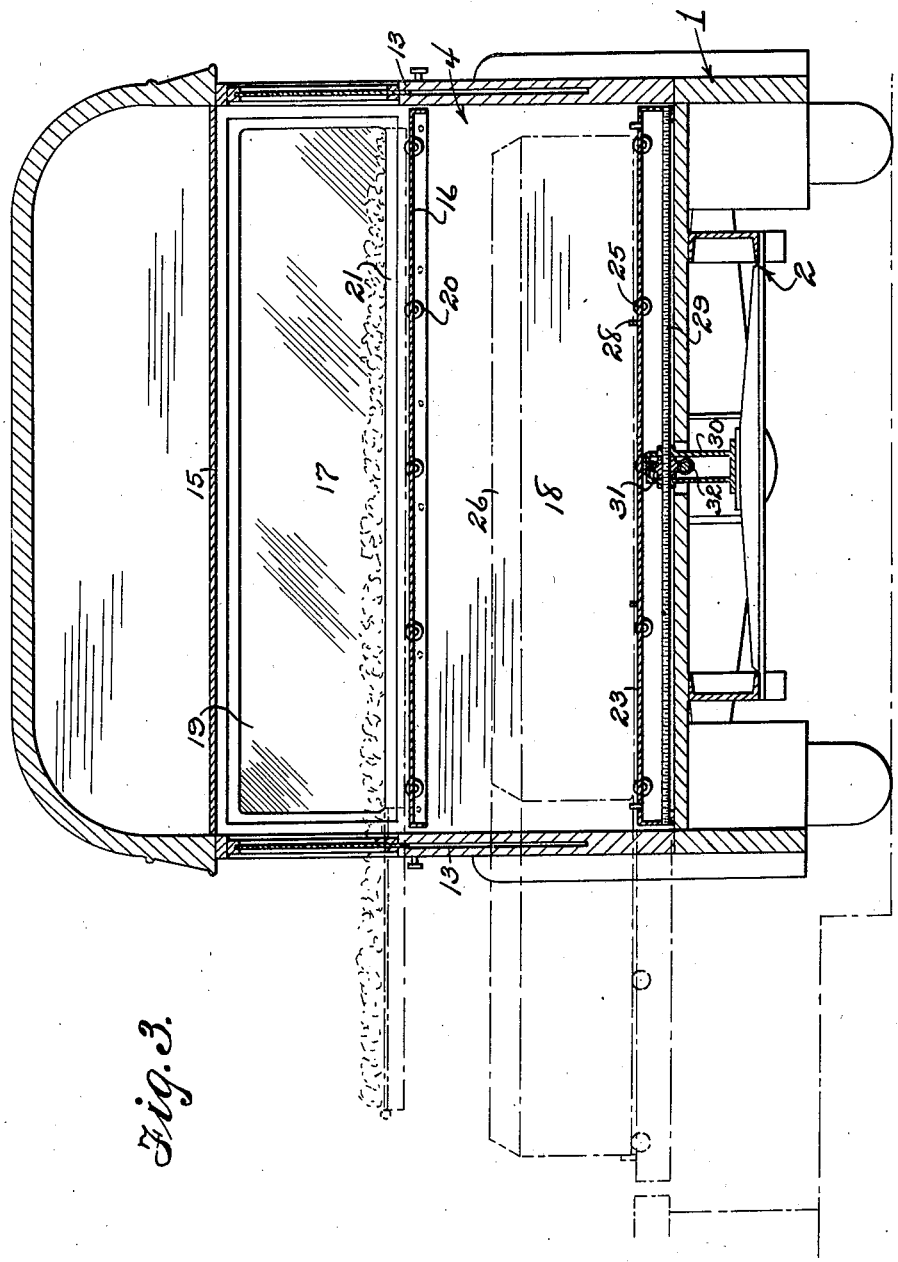

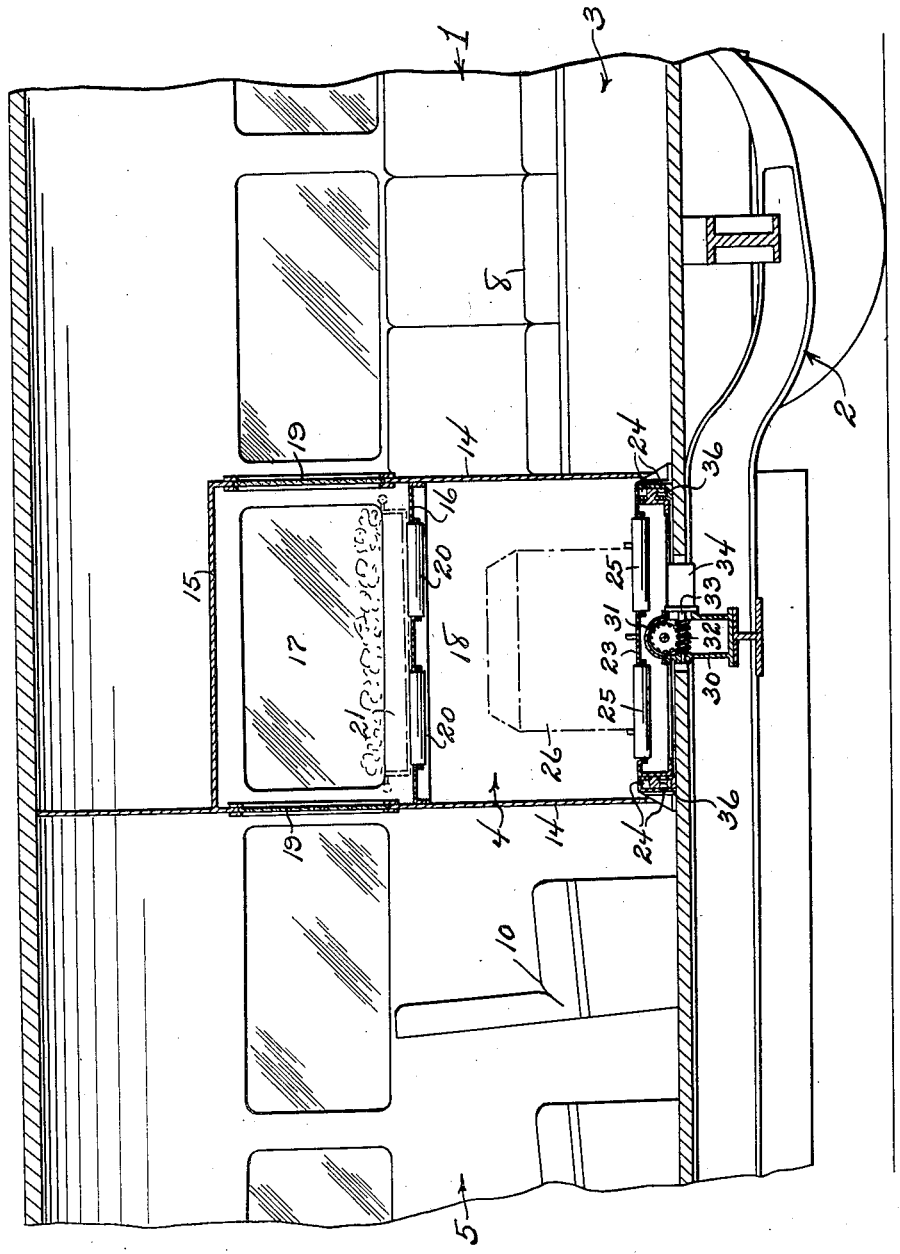

Aug. 28, 1934.  E. J. ROBERTSON  1,971,991
FUNERAL COACH
Filed Aug. 21, 1933    4 Sheets-Sheet 4
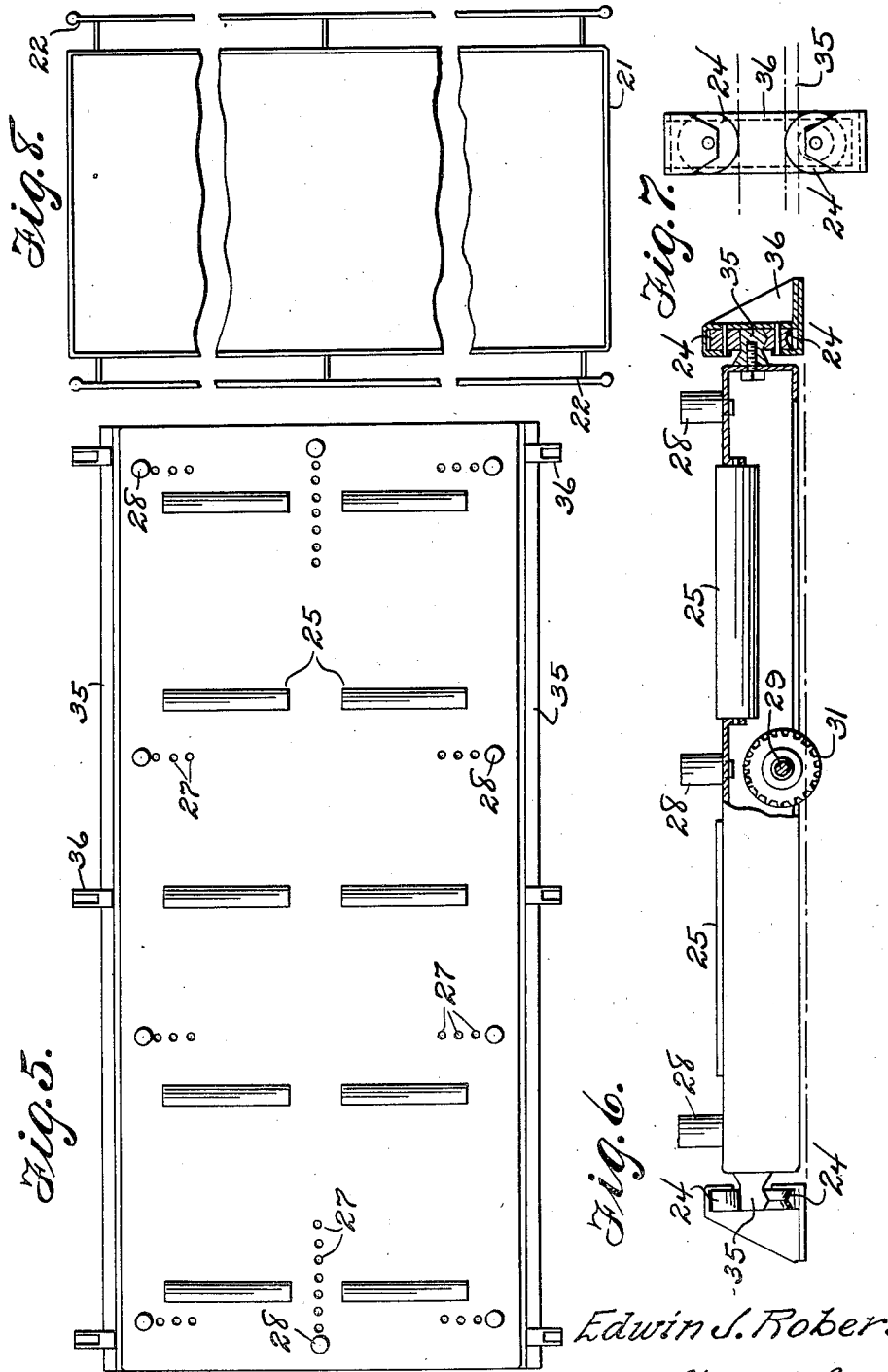
Edwin J. Robertson
INVENTOR
BY Victor J. Evans & Co.
ATTORNEY Patented Aug. 28, 1934

1,971,991

UNITED STATES PATENT OFFICE 1,971,991

FUNERAL COACH

Edwin Judson Robertson, Hamilton, Ontario, Canada

Application August 21, 1933, Serial No. 686,157

2 Claims. (Cl. 214—65)

This invention relates to funeral coaches and has for the primary object the provision of a vehicle body designed to be fitted to a motor vehicle chassis now commercially employed for busses, large trucks and the like and is so arranged as to accommodate the entire funeral party and funeral attendant along with the casket and floral pieces.

Another object of the invention is the provision of maximum seating capacity with a separate compartment for the casket and floral pieces and said compartment equipped with means for supporting the casket and moving the same in and out of the compartment by motor power under control by the driver.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a funeral coach mounted to a motor vehicle chassis and constructed in accordance with my invention.

Figure 3 is a transverse sectional view taken on the line 3—3 of Figure 2.

Figure 4 is a detail sectional view taken on the line 4—4 of Figure 2.

Figure 5 is a plan view illustrating the bier for the casket.

Figure 6 is a detail sectional view illustrating the means of mounting the bier in the casket compartment of the coach.

Figure 7 is a detail view showing rollers in their mounting for supporting the bier.

Figure 8 is a plan view illustrating a floral tray.

Figure 1:
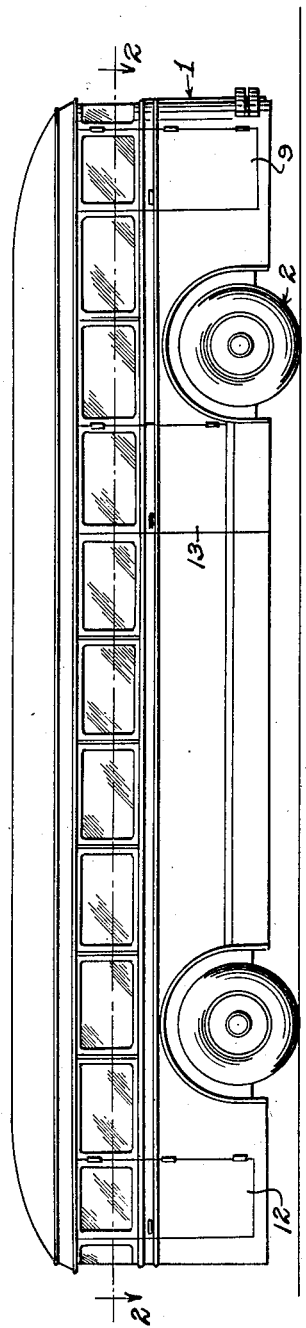
Figure 2:
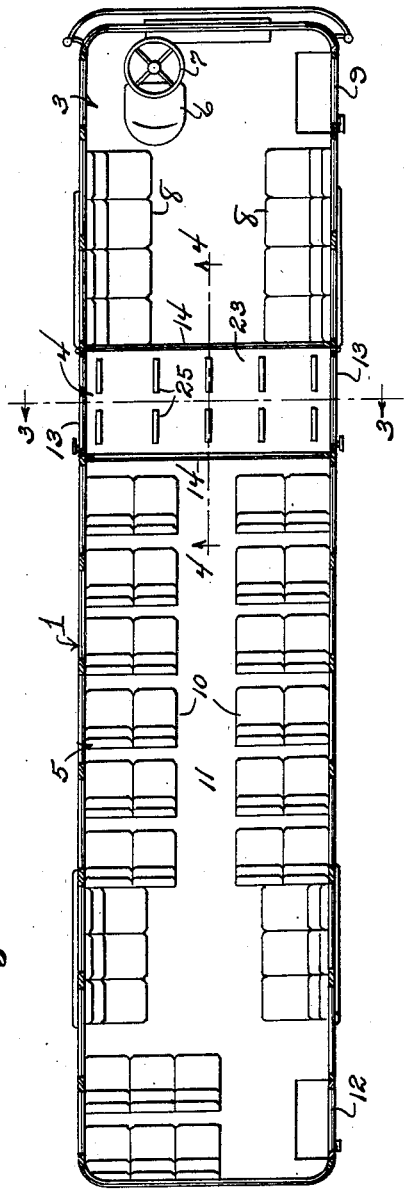
Figure 2 is a sectional view taken on the line 2—2 of Figure 1.

Referring in detail to the drawings, the numeral 1 indicates a vehicle body especially adapted to be employed for a funeral coach and is mountable on a truck or bus chassis 2. The vehicle body is formed into forward, intermediate and aft compartments 3, 4 and 5, respectively. The forward compartment is equipped with the driver's seat 6 and vehicle control 7, also side chairs 8 to accommodate the pallbearers, minister and funeral attendants. A door 9 is provided for the front compartment. The aft compartment has arranged therein a series of chairs 10, aisles 11 and a door 12 whereby the funeral party may be accommodated.

Doors 13 are arranged at opposite sides of the body for the casket compartment and said compartment is the intermediate compartment above referred to and is formed by transversely arranged partitions 14, one of which extends to the ceiling of the body while the other terminates short of the ceiling and in alignment with a horizontally arranged wall or partition 15 so as to provide a storage space for accommodating funeral equipment.

Arranged between the partitions 14 and below the wall 15 is a tray supporting shelf 16 which divides the intermediate compartment into upper and lower chambers 17 and 18, respectively. The upper chamber 17 is adapted to receive floral pieces while the chamber 18 is adapted to receive the casket. The partitions 14 are provided with windows 19 located above the shelf 16 so that the floral pieces may be viewed from either of the forward or aft compartments. The shelf 16 is equipped with a series of rollers 20 to facilitate the movement of a floral tray 21 into and out of the upper chamber. The tray 21 is provided with side handles 22 to facilitate the handling thereof.

A bier or table 23 is slidably supported by series of rollers 24 in the lower chamber and is adapted to slide transversely of the body 1 and into and out of the latter by way of the doors 13. The bier or table 23 is equipped with rollers 25 to facilitate the movement of a casket 26 onto and off of the same. The bier or casket is also provided with a series of openings 27 to receive pins 28 for locking the casket thereon.

A feed shaft 29 is journaled transversely of the lower chamber below the bier or table 23 and the latter carries a bracket 30 having sliding engagement with the feed shaft and between which operates a worm gear 31. The hub of the worm gear 31 is provided with feed threads to mesh with the feed threads 29. A worm 32 meshes with the worm gear and is carried by the power takeoff shaft 33 of an electric motor 34. The electric motor is preferably of the reversible type and the control, not shown, is located adjacent the driver's seat so that at the will of the driver the feed shaft may be caused to rotate in opposite directions for moving the bier or table inwardly or outwardly of the lower chamber and when outwardly of the chamber exposes the casket so that it may readily be lifted therefrom.

The bier or table is equipped with side rails 35 receivable between the guide rollers and the latter are arranged in pairs and supported by brackets 36. It is preferable that the lower rollers be of a grooved type to receive ribs upon the rails 35.

From the foregoing description, taken in connection with the accompanying drawings, it will be noted that an entire funeral party as well as the casket and floral pieces may be accommodated within a single vehicle body, the latter constructed to readily fit a motor vehicle chassis now in use.

While I have shown and described the preferred embodiment of my invention, it will be understood that minor changes in construction, combination and arrangement of parts may be made without departing from the spirit and scope of my invention, as claimed.

Having described the invention, I claim:

1. A funeral coach including a body having a compartment opening outwardly through opposite sides thereof, relatively spaced brackets located at opposite sides of the compartment, upper and lower pairs of relatively spaced rollers journaled to said brackets and said lower rollers having grooved peripheries, a bier arranged in the compartment between said brackets, rails secured to the sides of said bier and spaced therefrom and received between said pairs of rollers and ribbed to fit the grooved peripheries of the lower rollers, and means for sliding the bier in opposite directions.

2. A funeral coach including a body having a compartment opening outwardly through opposite sides thereof, relatively spaced brackets located at opposite sides of the compartment, upper and lower pairs of relatively spaced rollers journaled to said brackets and said lower rollers having grooved peripheries, a bier arranged in the compartment between said brackets, rails secured to the sides of said bier and spaced therefrom and received between said pairs of rollers and ribbed to fit the grooved peripheries of the lower rollers, a feed shaft journaled to the ends of said bier and underlying the latter, a worm gear having feed threads meshing with the feed shaft, a fixed bracket carried by the body and having the feed shaft slidable therethrough with the worm gear held against endwise movement of the feed shaft by said fixed bracket, a worm meshing with the worm gear, and electrical means for rotating the worm in either direction.

EDWIN JUDSON ROBERTSON.